G. C. HEIM.
RECEPTACLE.
APPLICATION FILED MAY 28, 1912.
1,107,066.
Patented Aug. 11, 1914.
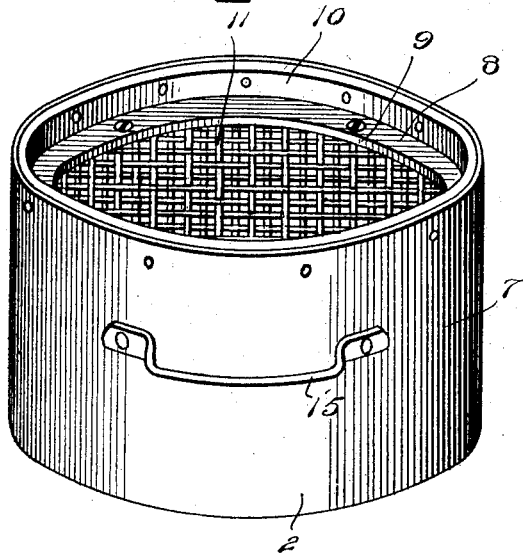
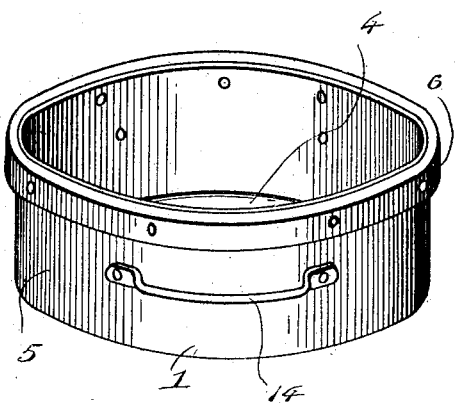
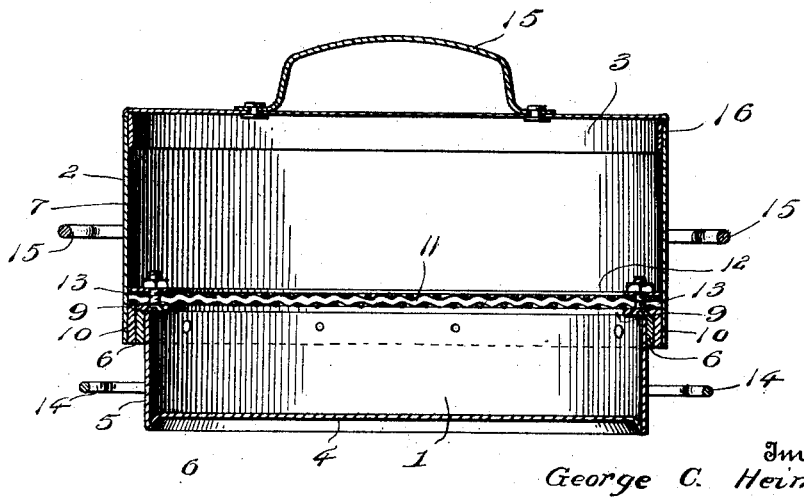
Inventor
George C. Heim.
Witnesses
By Victor J. Evans
Attorney

UNITED STATES PATENT OFFICE.

GEORGE CHRISTIAN HEIM, OF NEWARK, NEW JERSEY.

RECEPTACLE.

1,107,066.   Specification of Letters Patent.   Patented Aug. 11, 1914.

Application filed May 28, 1912. Serial No. 700,247.

*To all whom it may concern:*

Be it known that I, GEORGE C. HEIM, a citizen of the United States, residing at Newark, in the county of Essex and State of New Jersey, have invented new and useful Improvements in Receptacles, of which the following is a specification.

This invention relates to ash sifters and has for an object to provide a device of this character which will be so constructed to render the same dust proof whereby it may be used if desired in immediate proximity to a stove and operated without creating an external distribution of the dust.
Another object of the invention is to provide an ash sifter which will be strong and durable and which will include a cinder retaining tray and an ash or dust collecting receptacle, the former being rotatably mounted upon the latter whereby an effective separation of the dust and the ashes can be made with little manual labor.

Another object of the invention is to provide an ash sifter wherein the guard between the dust collector and the cinder collector will be designed to readily permit of the attachment thereto of a foraminous screening member or the detachment of said member therefrom with the minimum labor and the maximum rapidity.

In the drawing forming a portion of this application, and in which like letters of reference indicate similar parts in the several views:—Figure 1 is an inverted perspective view of the cinder collector. Fig. 2 is a perspective view of the dust collector. Fig. 3 is a vertical section through the complete device.

The device which has been designed with a view to eliminating the use of ash pans in the ash pits of stoves and which is particularly adapted to be used in immediate proximity to a stove as the ashes are removed therefrom comprises a lower dust collector 1, an upper cinder collector 2 and a cover 3. The dust collector is preferably in form of a cylindrical pan having a bottom 4 and an annular vertical wall 5, the latter having secured thereto and disposed exteriorly thereof a relatively strong reinforcing band 6. The cinder collector 2 preferably comprises a cylindrical member 7 whose diameter transversely exceeds the diameter of the lower member 1 so that the lower walls of the member 7 may be made to embrace the walls 5. Secured to the walls 7 interiorly thereof and also near the bottom is an angle iron ring 8 having a horizontal inwardly extending guard flange 9 and a vertical attaching flange 10, the latter serving in a measure to reinforce the walls 7 and to prevent the crushing in thereof on the careless handling or manipulation of the device.

The screening member 11 which consists preferably of a sheet of gauze or foraminous member of a configuration conforming with that of the member 2 is superimposed with relation to the flange 9 so that its outer portion is in flat contact with said flange with a view to finding a substantial purchase thereagainst. A clamping ring 12 is disposed above the screening member 11, being arranged in contact therewith and clamped thereto by removable fastenings such as bolts or the equivalent thereof 13 which are passed through the flange 9, the member 11 and the ring 12 as clearly shown in Fig. 3 of the drawing. This construction is such that the foraminous screening member 11 when worn may be removed at the convenience of the operator and replaced by a new member at a minimum cost and with maximum rapidity. It is stated that the lower end of the member 2 embraces the wall 5 of the member 1 whereby the latter may be rotated upon the former with the flange 9 resting against the upper edge of the band 6. When the companion members 1 and 2 of the device are associated with each other as shown in Fig. 3 flange 7 extends slightly into the member 1 so that the joint between the latter and the member 2 is sealed in such manner that the dust or ashes escaping through the screening member 11 will not be subjected or liable to external scattering or displacement.

The member 1 is provided with one or more handles 14 while the member 2 is provided with one or more similar handles 15. In operation the sifting device may be placed in such proximity to a stove that the ashes may be shoveled from the ash pit thereof and deposited directly in the member 2. One of the handles 14 is then held in one hand of the operator while one of the handles 15 is grasped in the other hand and the latter controlled so as to impart rotary movements to the member 2. The lid 3 which is provided herein is preferably provided with a handle 15 and a depending flange 16, the latter being adapted to snugly fit against the wall 7 so as to prevent the escape of the dust during the sifting operation. Rotating the member 2 on the member 1 causes the required separation of the ashes from the cinders, the latter remaining in the member 2 while the former will be collected and retained in the member 1. After the necessary movements have been imparted to the member 2 to cause the proper separation of the ashes from the cinders the cover 2 can be removed and water may be sprinkled upon the cinders remaining in the member 2 so as to allay the dust. Water sprinkled in this manner into the member 2 will find its way to the member 1 so that the ashes will be moistened sufficiently to prevent the escape of the dust when the members 1 and 2 are separated from each other.

I claim:—

A receptacle including upper and lower members, said upper member being of a greater diameter than said lower member and having its bottom edge embracing and spaced from the exterior surface of the upper edge of said latter mentioned member, a ring secured to and embracing the exterior surface of said lower member and disposed flush with the top edge thereof, and arranged within the space between the meeting ends of said members, another ring located wholly within the upper member and disposed flush with its bottom edge and flush with the bottom edge of the first mentioned ring, said last named ring being bent angularly at its medial portion to present vertical and horizontal engaging portions, said vertical portion frictionally engaging with the exterior annular surface of the first mentioned ring, while the horizontal portion extends inwardly and frictionally engages with the top edge of the said first mentioned ring and the top edge of the lower member and terminating inwardly of the lower member, whereby establishing a sealed joint between said members.

In testimony whereof I affix my signature in presence of two witnesses.

GEORGE CHRISTIAN HEIM.

Witnesses:
  ELIZABETH HEIM,
  HELEN HEIM.

Copies of this patent may be obtained for five cents each, by addressing the "Commissioner of Patents, Washington, D. C."